US005970570A

United States Patent [19]

Groninger

[11] Patent Number: 5,970,570
[45] Date of Patent: Oct. 26, 1999

[54] WINDSHIELD WIPER ASSEMBLY

[76] Inventor: Scott Groninger, 740 W. Cambourne, Ferndale, Mich. 48220

[21] Appl. No.: 09/017,123

[22] Filed: Feb. 2, 1998

[51] Int. Cl.[6] .......... B60S 1/38
[52] U.S. Cl. .......... 15/250.44; 15/250.38; 15/250.201; 15/250.451
[58] Field of Search .......... 15/250.44, 250.38, 15/250.43, 250.451, 250.47, 250.361, 250.46, 250.48, 250.201

[56] References Cited

U.S. PATENT DOCUMENTS

| | | | |
|---|---|---|---|
| 2,167,207 | 7/1939 | Horton | 15/245 |
| 2,543,383 | 2/1951 | Scinta et al. | 15/245 |
| 2,659,097 | 11/1953 | Morton | 15/245 |
| 2,712,146 | 7/1955 | Wise | 15/245 |
| 2,964,776 | 12/1960 | Ryck | 15/250.42 |
| 3,107,384 | 10/1963 | Wise | 15/250.43 |
| 3,128,491 | 4/1964 | Reese | 15/250.47 |
| 3,132,367 | 5/1964 | Wise | 15/250.42 |
| 3,392,415 | 7/1968 | Shipman | 15/250.38 |
| 3,643,286 | 2/1972 | Wubbe | 15/250.38 |
| 3,874,020 | 4/1975 | Van Eckelen et al. | 15/250.42 |
| 3,879,793 | 4/1975 | Schlegel | 15/250.42 |
| 3,978,543 | 9/1976 | Tomlin | 15/250.42 |

FOREIGN PATENT DOCUMENTS

| | | | |
|---|---|---|---|
| 2482540 | 11/1981 | France | 15/250.43 |
| 3600308 | 6/1986 | Germany | 15/250.44 |
| 3527528 | 2/1987 | Germany | 15/250.452 |
| 1255481 | 9/1986 | U.S.S.R. | 15/250.44 |
| 932232 | 7/1903 | United Kingdom | 15/250.38 |

*Primary Examiner*—Gary K. Graham
*Attorney, Agent, or Firm*—Gifford, Krass, Groh, Sprinkle, Anderson & Citkowski, P.C.

[57] ABSTRACT

An improved wiper assembly which is attachable to a wiper arm of a motor vehicle for wiping the window thereof. The wiper assembly includes a blade element and a support body for supporting the blade element. The blade element includes an elongated elastomeric blade having an elongated wiping edge, and an elongated blade retainer coextensive with and supporting the blade. The support body has two end portions and an interconnecting central portion. The central portion includes an interconnect region for interconnecting with the wiper arm. The end portions grip the blade retainer adjacent the ends of the blade retainer and the support body is operative to exert lengthwise tension on the blade retainer.

14 Claims, 5 Drawing Sheets

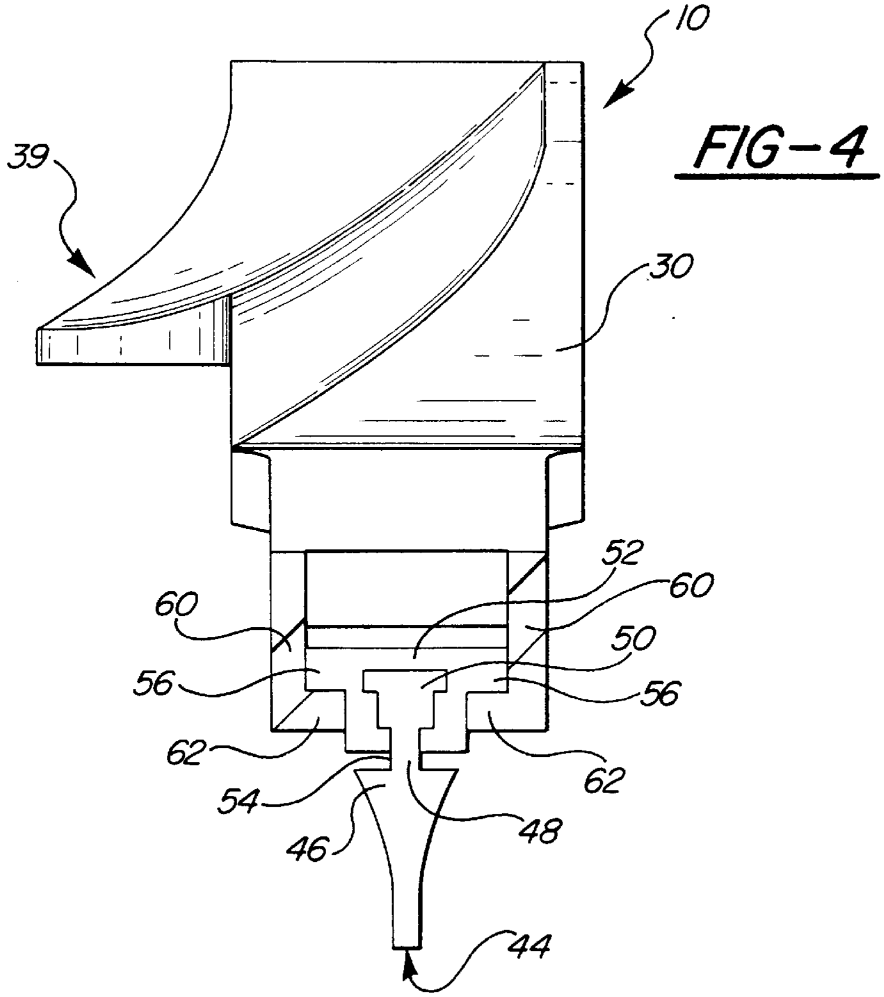
FIG-4
FIG-8
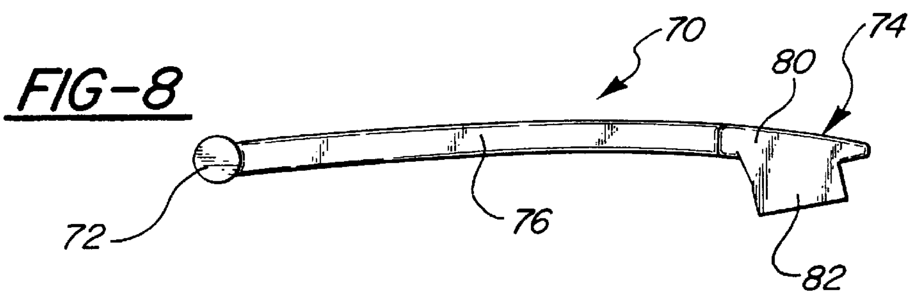
FIG-9
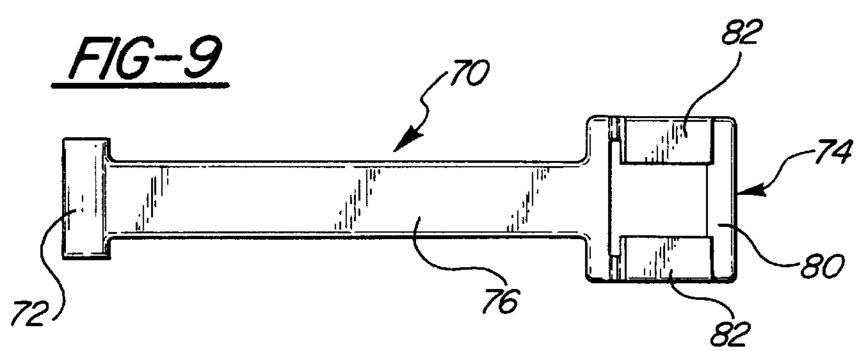

WINDSHIELD WIPER ASSEMBLY

FIELD OF THE INVENTION

This invention relates to wiper assemblies for wiping a window of a vehicle.

BACKGROUND OF THE INVENTION

Ideally, the windows of a vehicle are clean and unobstructed so that a vehicle operator may safely and comfortably view the environment surrounding the vehicle. It is desirable to remove moisture and debris which is deposited on the windows so that the vehicle operator's view remains clear. Windshield wiper assemblies for wiping moisture and debris from the window of a vehicle have been long known in the art. These windshield wiper assemblies have generally included an elongated blade element which is supported by some type of support body. The blade element typically includes an elongated resilient blade or squeegee and an elongated blade retainer for supporting the blade. The blade includes a lower portion with a wiping edge for contacting and wiping the window. The wiper assembly's support body is mounted to an arm or lever which cooperates with the support body to move the blade element across the window of a vehicle thereby removing moisture and debris from the window surface. Ideally, the wiper blade assembly completely and consistently wipes the surface of the window, is functional and durable under a variety of conditions, and is low in complexity, weight, and cost.

A common problem with currently existing wiper assemblies is that the window is not completely and uniformly wiped by the blade element. Instead, streaking occurs wherein some portions of the window are wiped clear while others are incompletely wiped. Streaking generally occurs because the contact force between the blade element and the window is not uniform along the length of the blade element. Where the contact force between a portion of the blade element and the window is too low, that portion of the element does not effectively wipe the area of the window over which it passes. To prevent streaking, it is desirable to provide a wiper assembly which supports the blade element in such a way that the contact force between the blade element and the window is nearly uniform along the entire length of the element.

In the early days of motorized vehicles, windows were substantially flat or planar. In this situation, a blade element could be uniformly loaded along its length by a sufficiently rigid support body which held the blade element in a straight line parallel to the planar window surface. As vehicle design has evolved, glass surfaces have become non-planar to accommodate the demands of enhanced styling and improved aerodynamics. This trend has become especially pronounced in the last few years as window, and especially windshield, surfaces of automobiles have increased substantially in size. In the majority of modem vehicles, the windshield and other window surfaces are not only curved, but the curvature of the window surface varies depending upon the location measured. Therefore, a wiper assembly designed to wipe a modem curved glass surface must be capable of conforming to the variety of curvatures which will be encountered as the wiper assembly moves across the window surface. In addition, the wiper assemblies must be long enough to wipe the majority of the ever-increasing window surface area. Therefore, it is desirable to have a wiper assembly which is capable of dynamically conforming a blade element to a variety of curved glass surfaces while at the same time maintaining nearly uniform contact force between the element and the glass surface.

Another factor contributing to wiping quality is the torsional stability of the blade element. As a blade element of a wiper assembly is moved across a glass surface, the blade experiences significant lateral force at its wiping edge which resists the movement of the blade element across the glass surface. This force creates a twisting or torsional force in the blade element which, if unresisted, will cause the blade element to twist until the wiping edge is no longer held in contact with the glass surface. Ideally, the blade element is held such that the resilient blade is approximately perpendicular to the glass surface when the blade is not moving or loaded. As the blade element is moved laterally across the glass, the torsional forces cause the resilient blade to flex a small amount such that one side of the wiping edge contacts the glass. When the blade element moves in the opposite direction, the resilient blade deforms or "flips" in the opposite direction exposing the opposite side of the wiping edge. Modem blade elements are designed such that the amount of flip or deformation of the resilient blade is controlled so that optimal wiping can occur. The design of the blade element requires that the retaining portion of the blade element and the wiper assembly resist torsional forces so that the only significant deformation in the blade is due to the flex of the resilient blade itself rather than deformation of the entire assembly.

Besides trying to allow a blade element to dynamically conform to a curved glass surface while maintaining uniform contact force and resisting torsional forces, a wiper assembly must also be capable of functioning under a variety of changing conditions. One particularly challenging condition is the presence of ice, slush, or snow on the wiper assembly. This is generally referred to as "icing" of the wiper assembly. To prevent icing from interfering with the function of the wiper assembly, it is desirable to minimize the number of exposed joints, pivots, or moving parts since exposed parts are likely to collect snow or ice. When ice accumulates around or in a joint or moving part, the movement of the joint or part may be restricted thereby preventing the wiper assembly from functioning properly. Many modem windshield assembly designs include a large number of pivots and moveable links and are therefore highly prone to icing. In these situations, the typical solution is to cover the moveable parts with a flexible covering or "boot" so that ice and snow cannot accumulate between the moveable parts. However, this flexible covering adds cost and weight to the wiper assembly and may create an unpleasant physical appearance or reduce aerodynamic performance.

Because wiper assemblies are located on the exterior of a vehicle, they are often exposed to high speed wind. The wind force exerted on the wiper assembly may attempt to lift the wiper assembly out of contact with the vehicle window thereby reducing the contact force between the blade element and the window. This in turn adversely affects the performance of the wiper assembly. As air flows over the wiper assembly it may also create wind noise which is distracting and unpleasant for the vehicle's operator. It is desirable for a windshield wiper assembly to be designed such that the effects of wind lift and wind noise are kept to a minimum. Generally, the greater the cross-section, complexity, and number of structural members comprising the wiper assembly, the greater the tendency towards wind lift and wind noise. Therefore, it is desirable to minimize the cross-section, complexity, and number of structural elements required.

Currently available wiper assembly designs fall short of providing all of the desired features of an ideal wiper assembly. The most common currently available wiper assembly includes a blade element having an elongated elastomeric blade held in a plastic and/or metal blade retainer. The blade retainer is in turn supported at numerous points by a metal support body. The support body includes a variety of links and pivots interconnecting the retainer support points so that the blade element has a limited ability to conform to a curved glass surface. The support body is supported on a wiper arm which is biased toward the vehicle window so that force is transmitted through the support body to the blade element through the plurality of support points. This approach has several drawbacks. The use of multiple links and pivots is complicated and costly, and creates compliance in the assembly. Compliance may reduce the stability of the blade retainer and cause noise. This compliance will tend to increase as the assembly wears. In terms of wiping quality, the use of discrete support points to support the blade element leads to nonuniform contact force between the blade element and the window. Portions of the blade element immediately adjacent the support points are more heavily loaded than those portions of the blade element that are located away from or between the support points. Therefore, the contact force between the blade element and the window is nonuniform along the length of the blade element. The nonuniformity can be reduced somewhat by increasing the number of the support points. However, as the number of contact points is increased, the cost and complexity of the wiper assembly is also increased. Increasing the number of support points also requires an increase in the number of links and pivots. This in turn leads to additional compliance in the assembly and increases the assembly's susceptibility to icing, wind lift, noise, and wear. The nonuniformity of contact force can also be reduced somewhat by increasing the stiffness of the retainer portion of the blade element. This helps to distribute the load applied at the support points to the rest of the blade element. However, increasing the stiffness of the retainer portion adversely affects the ability of the wiper assembly to conform to a curved glass surface.

Another approach to providing a more uniform contact force between a blade element and a window is to support the blade element in tension using a minimum of support points. By supporting the blade element in tension at its ends, the contact force between the blade element and window is nearly uniform and independent of the curvature of the window. As the tensioned blade element conforms to the glass surface, a component of the tensioning force is directed towards the glass and tends to create a uniform contact force between the blade element and the glass. The blade element is capable of dynamically conforming to a variety of glass curvatures. It also can easily conform to a glass surface where curvature is greater toward one end of the blade. By eliminating intermediate support points, point loads are eliminated thereby preventing portions of the blade element from being more heavily loaded than the surrounding portions. There have been several attempts to provide a wiper assembly which supports a blade element in tension, but each of these attempts has drawbacks.

U.S. Pat. No. 2,167,207 to Horton discloses a wiper assembly which places a blade element in tension. The support body has an integral spring which biases the support body to tension the blade element. The complicated support body leads to a heavy and expensive wiper assembly which would be prone to icing. Torsional forces may be resisted by supporting the element in a slotted tube. However, this form of support stiffens the blade element allowing it to conform only to minor irregularities in the glass surface.

U.S. Pat. No. 2,659,097 to Morton discloses a wiper assembly which creates tension in the blade element using a spring that is integral with the blade element. Tension is created in the blade element by attaching opposite ends of the integral spring to a metal support body. This approach allows the blade element to conform to a variety of surfaces and maintains reasonably uniform contact pressure between the blade element and the glass surface. However, his approach to creating tension also places the elastomeric blade in tension which creates stress in the blade which adversely affects its performance and longevity. The use of an integral spring also complicates the manufacturing of the blade element and the installation of the blade element into the support body. The wiper assembly relies on the integral spring to resist torsional forces. Also, the use of a metal support body having sufficient strength to resist the integral spring causes the wiper assembly to be heavy.

U.S. Pat. No. 3,132,367 to Wise discloses a wiper assembly which places the blade element in tension by supporting the blade element at both of its ends using a spring steel support body. This design lacks any intermediate support of the blade element to prevent twisting of the blade element. Instead, twisting is prevented by a retainer portion of the blade element being made of steel. In order for this retainer portion to successfully resist twisting of the blade element, it must be stiff enough such that it will impede the ability of the blade element to conform to a curved glass surface. Therefore, while the design may be able to conform to a slightly curved surface, it will be unable to conform to the more radically curved surfaces of modem vehicle windows.

U.S. Pat. No. 3,392,415 to Shipman discloses a wiper assembly which places the blade element in tension using a support body with a telescoping end section and a spring which biases the support body to a longer length. The telescoping end section adds cost, complexity and weight to the support body and also is prone to interference from icing. The design also lacks any type of intermediate torsional support.

U.S. Pat. No. 3,874,020 discloses a wiper assembly which includes a support body having a central pivot. The support body supports the blade element at its ends such that when a downward force is placed at the pivot, the support body creates tension in the blade element. This design relies on the downward force created by the wiper arm to create tension in the blade element. The design also includes a metal insert in the blade element which creates additional downward force in the center of the span of the blade element. This piece complicates the manufacture of the blade element and increases its cost and complexity. The design lacks any type of intermediate torsional support.

SUMMARY OF THE INVENTION

There is disclosed herein an improved wiper blade assembly of the type which is attachable to a wiper arm of a motor vehicle for wiping a window thereof. The wiper assembly includes an elongated elastomeric blade with an elongated wiping edge, and an elongated blade retainer coextensive with and supporting the blade. The assembly also includes a support body supporting the blade element. The support body has first and second end portions and a central portion extending between the end portions. The central portion has an interconnect region for interconnection with the wiper arm. Each of the end portions grips the blade retainer adjacent the ends of the blade retainer and the support body is operative to exert lengthwise tension on the blade retainer. In some embodiments, the elastomeric blade is supported in the blade retainer such that the blade is free to move along the length of the retainer so that tension exerted on the retainer is not transferred to the blade. In other embodiments, the wiper assembly also includes one or more torsional stabilizers for stabilizing the blade retainer against torsional forces. The torsional stabilizers are connected to the support body and engage the retainer at a location between the ends of the retainer.

BRIEF DESCRIPTION OF THE DRAWINGS

FIG. 4 is a cross-sectional view of the wiper assembly of FIG. 2 taken along lines 4—4;

FIG. 8 is a side view of the torsional stabilizer of FIG. 6; and

FIG. 9 is a bottom view of the torsional stabilizer of FIG. 6.

DETAILED DESCRIPTION OF THE PREFERRED EMBODIMENT

Figure 1:
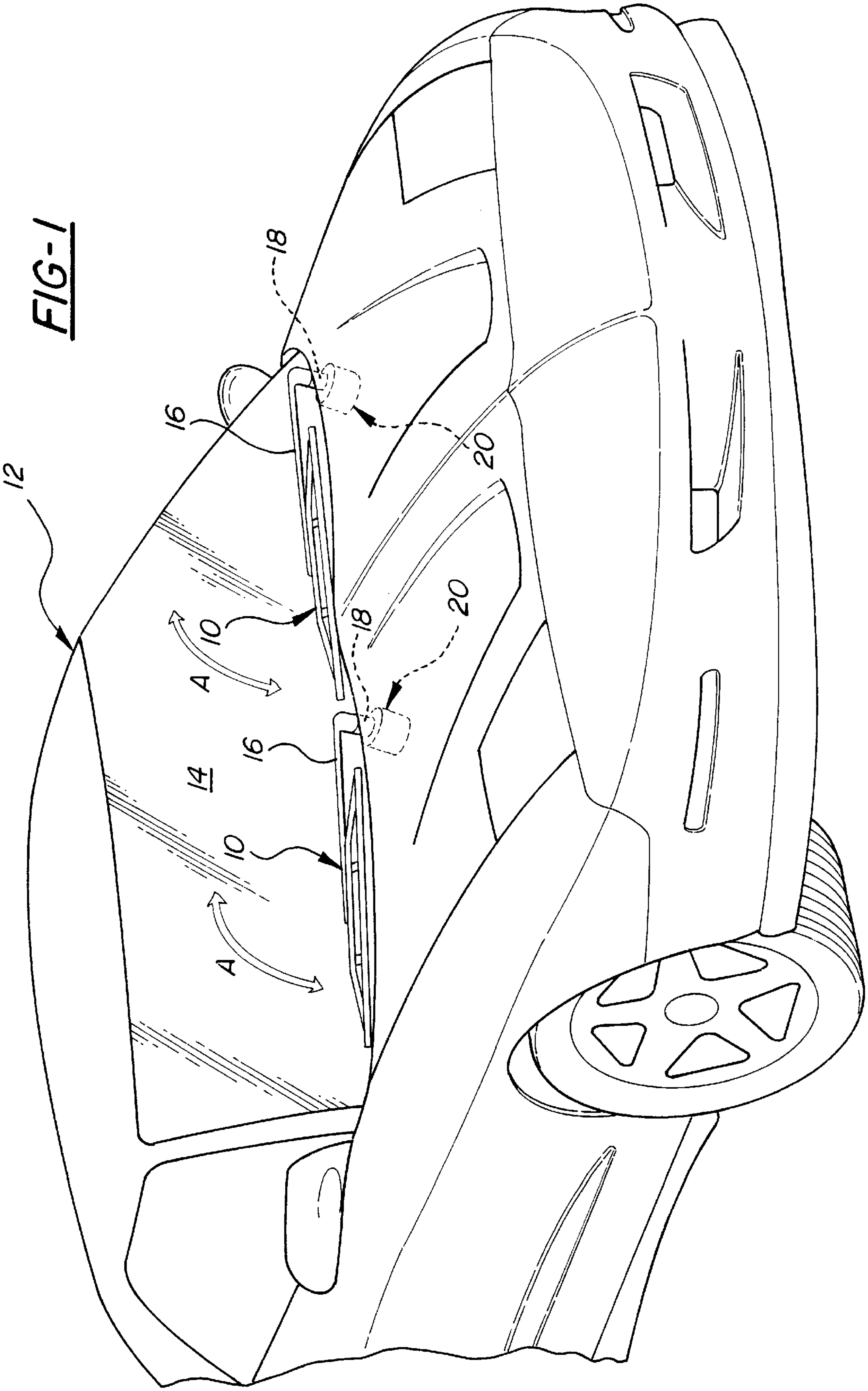
FIG. 1 is a front three-quarter view of a vehicle with a wiper assembly according to the present invention operatively installed.

Referring to FIG. 1, wiper assemblies 10 according to the present invention are shown in their operative positions installed on a vehicle 12. The wiper assemblies 10 are held in position on the windshield 14 of the vehicle 12 by wiper arms 16. The wiper arms 16 are in turn supported by rotational shafts 18 which form part of a wiper actuating mechanism 20. As will be clear to one of skill in the art, the wiper actuating mechanism 20 may be of various designs such that the mechanism 20 rotates the rotational shafts 18 in a clockwise direction a predetermined amount so that the wiper assemblies 10 are moved across the windshield 14 in an arc as indicated by arrows A. The mechanism 20 then reverses the rotational direction of the rotational shafts 18 thereby returning the wiper assemblies 10 to a starting position. As the wiper assemblies 10 are moved across the windshield 14, they wipe the windshield surface thereby removing precipitation and debris from the windshield 14. The wiper arms 16 preferably are spring loaded so that they provide sufficient force to maintain the wiper assemblies 10 in contact with the windshield 14 throughout the wiping operation and under a variety of conditions.

Figure 2:
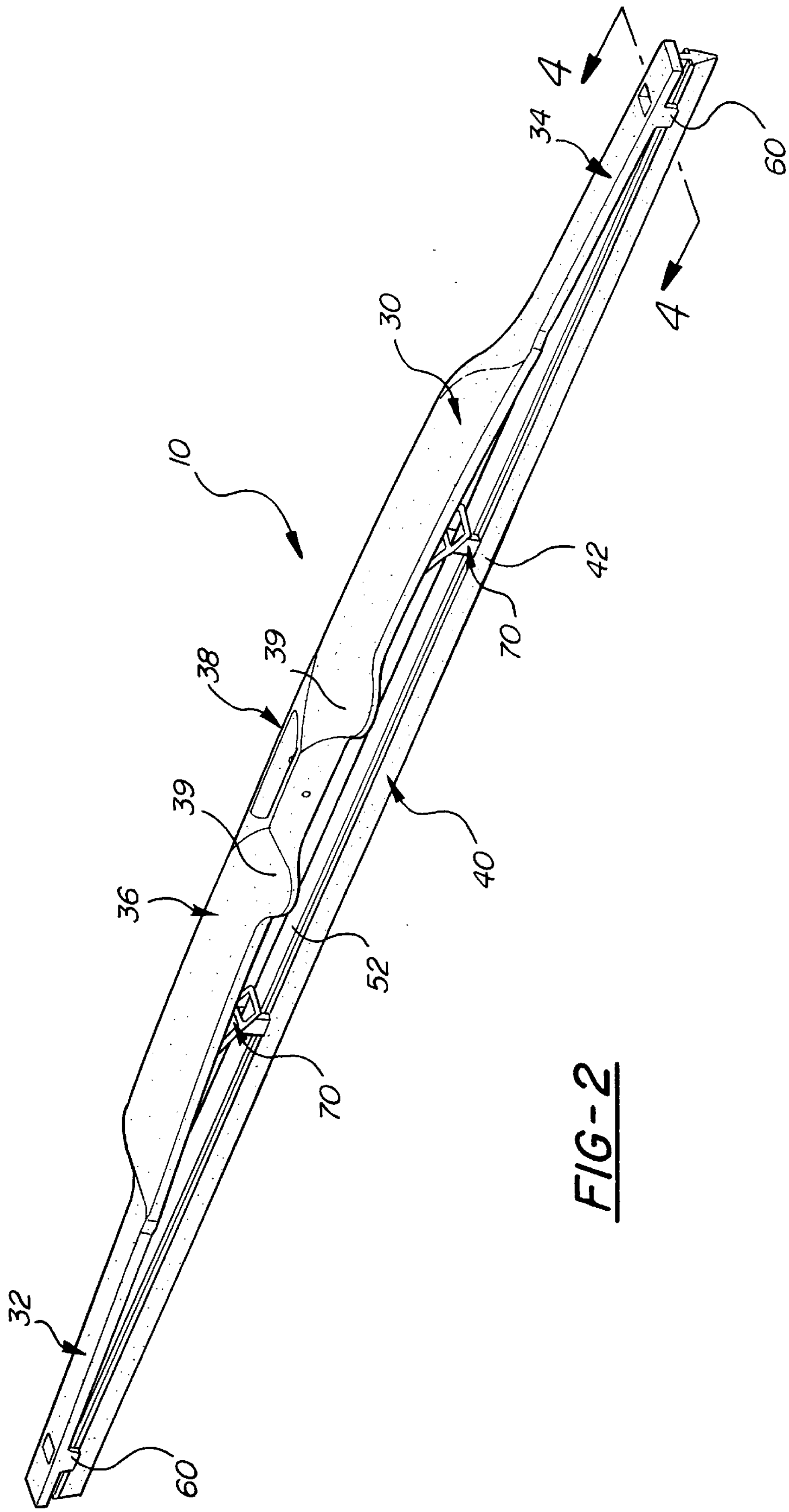
FIG. 2 is a perspective view of a wiper assembly constructed according to the present invention.
Figure 3:
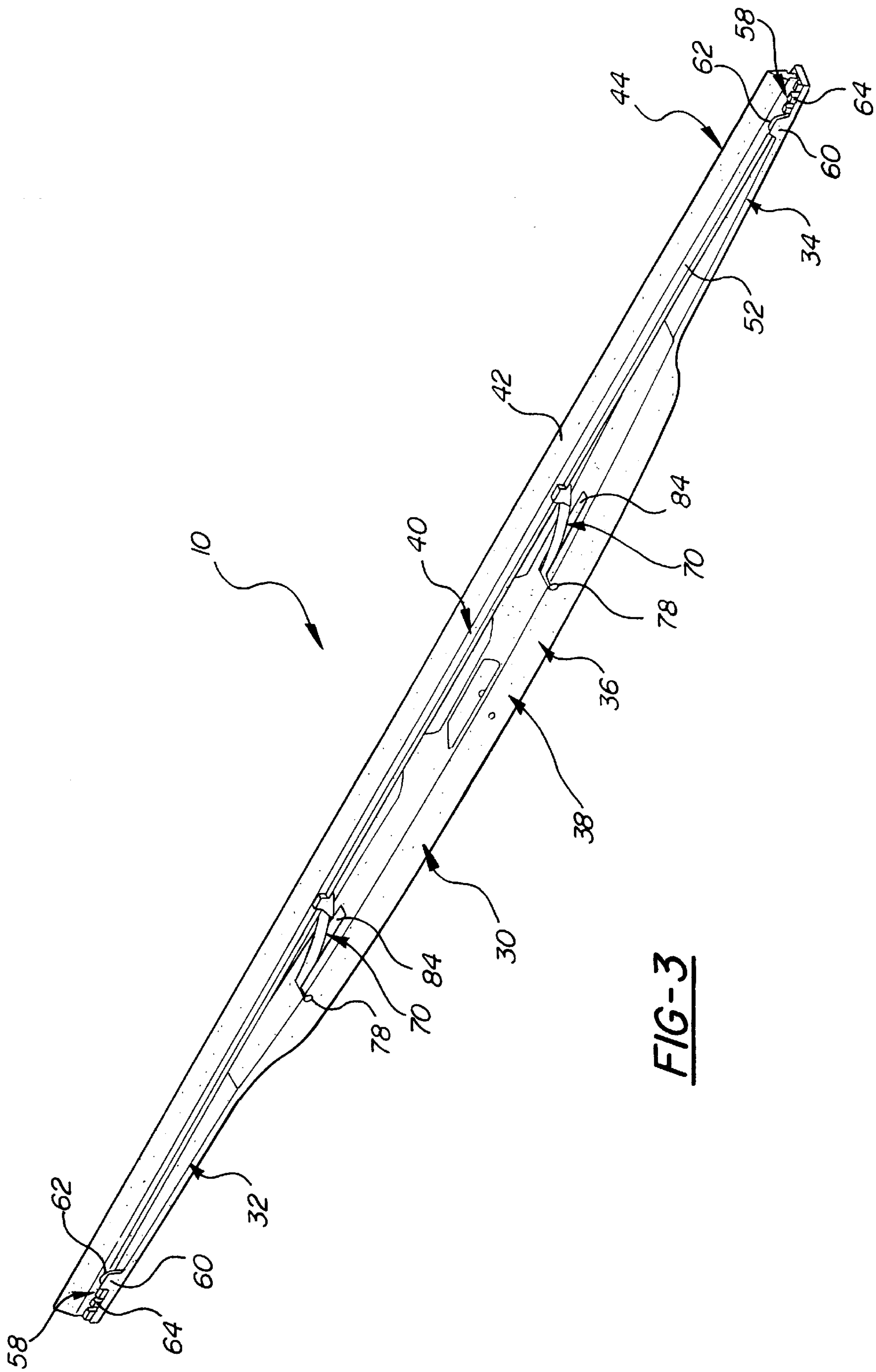
FIG. 3 is another perspective view of the wiper assembly of FIG. 2 showing the underside of the assembly.

Referring now to FIGS. 2–4, the wiper assembly 10 is shown in more detail. The wiper assembly 10 includes an elongated unitary support body 30 which supports an elongated blade element 40. The blade element 40 includes an elongated elastomeric blade 42 which is supported by a coextensive elongated blade retainer 52. As will be clear to one of skill in the art, the blade 42 and retainer 52 may be of various designs. In the preferred embodiment, the elastomeric blade 42 and the retainer 52 are coextensive with the retainer 52 being supported by the support body 30. The elastomeric blade 42 is formed with a thin lower edge which acts as a wiping edge 44 configured for contacting and wiping a glass surface. Moving upwardly away from the wiping edge 44, the cross-sectional width of the blade 42 widens to form a shoulder portion 46, then narrows down to form a flex portion 48 and finally increases in cross-sectional width again to form a flange portion 50. The coextensive blade retainer 52 is formed with an elongated slot 54 in its underside. The flange portion 50 of the blade 42 engages the slot 54 in the underside of the blade retainer thereby giving support to the blade 42. The flange 50 and slot 54 are sized and shaped such that the blade 42 is captive and not allowed to move downwardly out of the retainer 52. However, it is preferred that blade 42 be allowed to move longitudinally in the retainer 52; at least a small distance. The longitudinal freedom prevents the blade 42 from being in tension with the remainder of the blade element 40. If the blade 42 itself were placed in tension, the performance and longevity of the blade may be compromised. The flex portion 48 of the blade 42 extends downwardly from the underside of the blade retainer 52 so that the shoulder portion 46 of the blade 42 is separated from the underside of the blade retainer by a short distance. As the wiper assembly moves across the glass surface in the direction indicated by arrows B—B, the flex portion 48 of the blade 42 flexes so that one or the other side of the shoulder portion 46 of the blade 42 comes into contact with the underside of the blade retainer 52 allowing trailing deflection in the blade 42. Thereby, the wiping edge 44 trails its normal undeflected position such that one side of the wiping edge 44 contacts the glass surface.

Referring now to FIGS. 2–5, the blade retainer 52 further includes an elongated longitudinal ridge 56 extending from each of its sides. The ridges 56 provide purchase for the support body 30 to support the blade retainer 52. A notch 58 is formed in each of the ridges 56 adjacent each of the ends of the retainer 52 to provide additional purchase for the support body 30. Preferably, the blade retainer 52 is formed from plastic or metal so that it resists twisting and has some resilience. However, the retainer 52 must be flexible enough to conform to a curved surface.

Referring now to FIGS. 2–4, the support body 30 has a first end portion 32, a second end portion 34, and a central portion 36 interconnecting the end portions. The end portions, 32 and 34 each include a means for gripping the blade retainer 52 proximate the ends of the retainer and for placing the retainer in tension. In the illustrated embodiment, the gripping means for each end portion, 32 and 34, includes a pair of gripping members 60 extending downwardly from the support body 30. Each gripping member 60 includes a tab 62 for extending beneath the ridge 56 on the side of the retainer 52 thereby holding the retainer against the support body 30. Each gripping means further includes a pair of projections 64 (best seen in FIG. 3) extending from the underside of the support body 30 for engaging the notches 58 in the ridges 56. The engagement between the projections 64 and the notches 58 allows the support body 30 to apply lengthwise tension to the retainer 52. The projections 64 preferably have ramps on one of their sides to ease installation of the blade element 40 onto the support body 30. As will be clear to one of skill in the art, the gripping means may be designed in any one of a number of ways. The ridges, notches, tabs, and projections may be arranged differently or the gripping means may not use them. For example, the blade retainer 52 and the support body 30 may be formed as one piece or the retainer 52 and support body 30 may be interconnected using a fastener such as a nut and bolt. Whatever approach is used, it is desirable that the support body 30 grip the blade retainer 52 securely so that the support body may exert lengthwise tension on the blade retainer.

As shown in FIGS. 2 and 3, the wiper assembly 10 further includes torsional stabilizers 70 extending downwardly from the underside of the support body 30. The torsional stabilizers 70 support the blade retainer 52 at two points intermediate the ends of the retainer and resist torsional forces. However, unlike prior art, the torsional stabilizers 70 are designed to not exert any significant downward force on the retainer 52 and therefore do not create pressure points or adversely effect the uniformity of contact force between the blade 42 and the glass surface.

Referring now to FIGS. 6—9, various views of a preferred embodiment of a torsional stabilizer 70 are shown. Each torsional stabilizer 70 has a transverse pivot rod 72 at one of its ends, an engaging portion 74 at its other end and a bridge member 76 interconnecting the two ends. The pivot rod 72 is designed to slide into a pivot slot 78 formed in the underside of the support body 30 and as best seen in FIG. 3. The engagement portion 74 includes a body 80 with fingers 82 extending downwardly and inwardly defining a C-shaped opening. The opening is sized to accept the upper portion of the blade retainer 52 such that the ridges 56 on the sides of the retainer 52 are captured between the body 80 and fingers 82 of the engagement portion 74. However, there is sufficient clearance between the engagement portion 74 and the retainer 52 to allow the retainer to slide lengthwise relative to the stabilizer 70. The bridge member 76 interconnecting the pivot rod 72 and the engagement portion 74 is designed to fit into stabilizer recesses 84 formed in the underside of the support body 30. In operation, when the blade element 40 contacts a glass surface, it will be forced to conform to the glass surface by the downward force created by wiper arm 16. As the blade element 40 conforms to the glass surface, the blade element will be forced towards the support body 30 thereby further flexing the support body and creating additional tension in the blade retainer 44. As the blade element 40 moves towards the support body 30, the engagement portion 74 of the torsional stabilizers 70 will also be moved upwards. However, the torsional stabilizers 70 are designed not to resist this upward movement as the pivot rod 72 can move freely in the pivot slot 78 in the support body 30 and the bridge member 76 can retract into the stabilizer recess 84. Therefore, the torsional stabilizers 70 do not create point loads on the blade element 40 which would lead to wiping quality problems. Instead, as the blade element 40 is moved across the glass surface, as indicated by arrow A in FIG. 1 and arrow B in FIG. 4, the blade element 40 will attempt to twist due to the force exerted on the wiping edge 44. As the blade retainer 52 attempts to twist, the fingers 82 of the torsional stabilizers 70 will stabilize the retainer 52 thereby resisting the torsional force. The torsional stabilization function performed by the stabilizer 70 may alternatively be implemented in other ways. For example, stabilizers with additional links and pivots may be used especially where the distance between the blade element and the support body is greater than in the illustrated embodiment. Torsional stabilization may also be provided by links which slide within the support body or are connected using living hinges. Yet another alternative is to use a blade retainer designed to resist torsional forces but still capable of conforming to a curved surface.

Referring now to FIGS. 2 and 3, the support body 30 is designed such that different portions have differing flexibilities. The support body 30 is preferably formed from a synthetic polymer material which allows this variation in flexibility. Various polymers may be used including but not limited to acrylonitrile butadiene styrene; polyoxymethylene; polybutylene terephthalate; polyimide; polystyrene; and polypropylene. The support body may also be formed from a reinforced composite which may include a polymer and a fiber such as glass fiber, carbon fiber, aramid fiber, and ceramic fiber. As will be clear to one of skill in the art, the best material will depend on the application and performance requirements. Some applications, such as a vehicle with a highly curved windshield, will require a support body with a high degree of flexibility. Others will require less flexibility. In all cases, the material should be stable in the presence of ultraviolet light so that the support body does not break down in the presence of sunlight.

In the embodiment shown, the central portion 36 of the support body 30 has a thicker cross-section than the end portions 32 and 34. The end portions 32 and 34 are designed to have significantly greater flexibility than the central portion 36. However, the entire length of the support body 30 is designed to resist torsional forces. The central portion 36 has a raised spine 38 to resist both bending and torsional forces. The end portions 32 and 34 are wider than they are thick so that they will more easily bend but the material and dimensions allows the end portions to resist torsion. Alternatively, the support body 30 may be designed so that the entire length is flexible or only one end portion is flexible. The latter approach may be desirable where the glass surface to be wiped has greater curvature toward one end of the wiper assembly 10 so that the blade 42 is required to be highly conformable near one of its ends.

Figures 5, 6, 7:
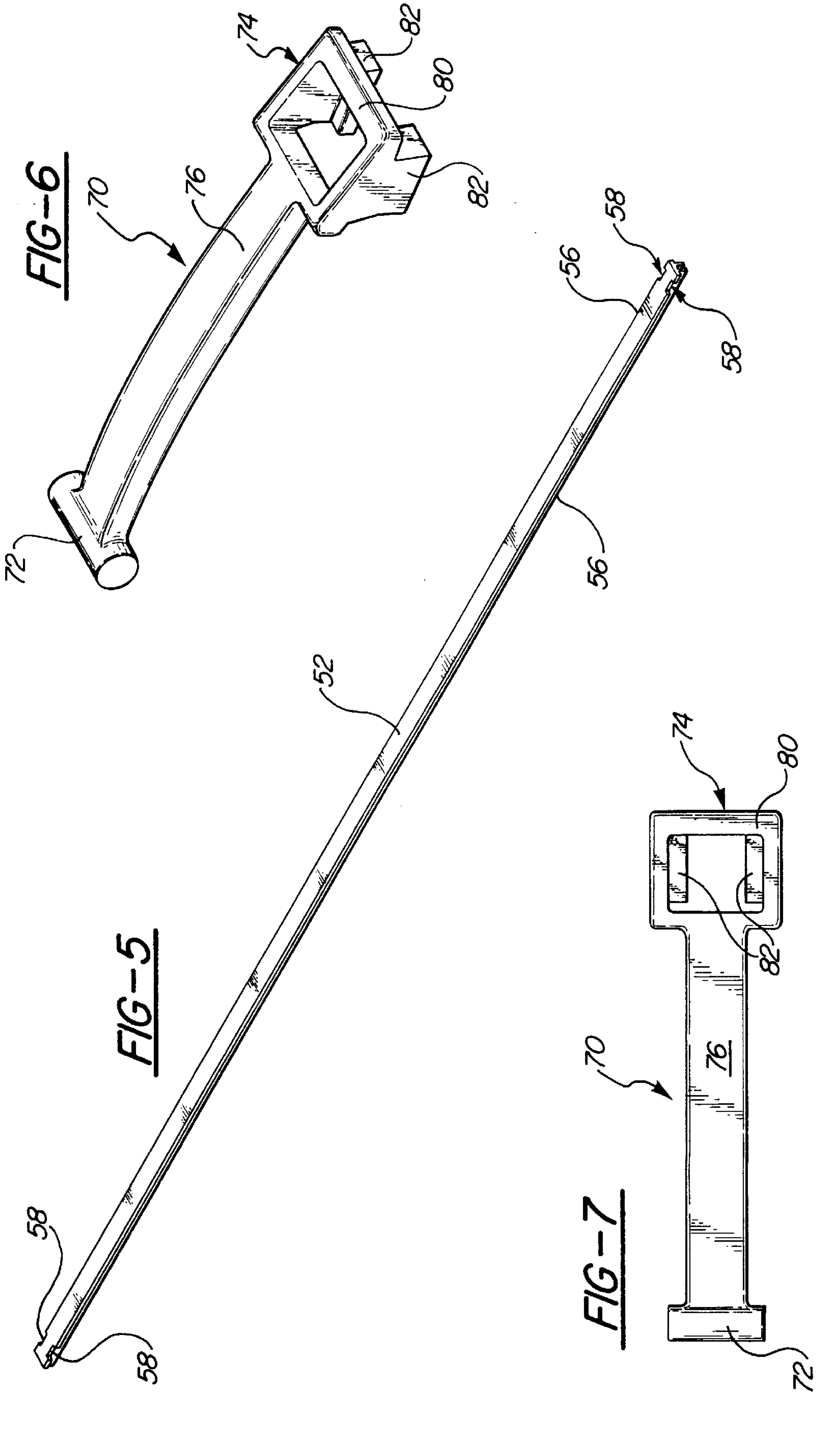
FIG. 5 is a perspective view of a blade retainer for use with a wiper assembly.
FIG. 6 is a perspective view of one embodiment of a torsional stabilizer.
FIG. 7 is a top view of the torsional stabilizer of FIG. 6.

The central portion 36 of the support body 30 also includes an interconnect region 38 for interconnecting with a wiper arm 16. The configuration of the interconnect region 38 may be of several different designs depending upon the type of interconnect chosen for interconnecting the support body 30 and the wiper arm 16. The central portion 36 also includes air foils 39 as best shown in FIG. 5. These air foils 39 help to redirect the wind incident on the wiper assembly 10 as the vehicle 14 moves through the air.

The support body 30 has an unstressed length which is longer than its length would be with a blade retainer 52 installed. When the support body 30 is in its unstressed, unassembled position, the distance between the gripping members 60 is greater than when the support body 30 has a blade retainer 52 installed as shown in FIG. 2. Therefore, to assemble a support body 30 and a blade retainer 52, the support body 30 must first be flexed such that the gripping members 60 are brought closer to one another. The support body 30 acts much like a bow with the blade retainer 52 acting as the tensioned bow string. As the support body 30 is flexed to grip the blade retainer 52, the support body 30 exerts lengthwise tension on the blade retainer 52.

The wiper assemblies described above may be modified in several ways without departing from the spirit of the invention. For example, the blade element may be of the type including multiple wiping edges. The wiper assembly may also include more or fewer torsional stabilizers. A shorter overall wiper assembly will require fewer or none of the torsional stabilizers since the blade element will be torsionally stabilized at each of its ends.

In view of the teaching presented herein, other modifications and variations of the present inventions will be readily apparent to those of skill in the art. The foregoing drawings, discussion, and description are illustrative of some embodiments of the present invention; but are not meant to be limitations on the practice thereof. It is the following claims, including all equivalents, which define the scope of the invention.

I claim:

1. A wiper assembly attachable to a wiper arm of a motor vehicle for wiping a window thereof, said assembly comprising:

a blade element comprising;

an elongated elastomeric blade having an elongated wiping edge; and an elongated blade retainer coextensive with and supporting said blade, said retainer having two ends and an elongated midportion; and a unitary support body for supporting said blade element, said body having first and second end portions and a central portion extending between said end portions, said central portion including an interconnect region for interconnection with the wiper arm, said first and second end portions each having gripping means, said gripping means operative to grip said blade retainer adjacent said ends of said blade retainer, said support body being operative to exert lengthwise tension on said blade retainer;

said blade supported in said retainer such that said blade is free to move along the length of said retainer so that when tension is exerted by said body on said retainer, said tension is not transferred to said blade.

2. The wiper assembly of claim 1, wherein said central portion of said support body has a first rigidity and said first end portion has a second rigidity less than the first rigidity.

3. The wiper assembly of claim 2, wherein said second end portion has a third rigidity less than the first rigidity.

4. The wiper assembly of claim 1, wherein said unitary support body is comprised of a synthetic polymeric material.

5. The wiper assembly of claim 4, wherein said polymer is chosen from the group consisting of acrylonitrile butadiene styrene; polyoxymethylene; polybutylene terephthalate; polyimide; polystyrene; polypropylene; and combinations thereof.

6. The wiper assembly of claim 4, wherein said polymer is a reinforced composite.

7. The wiper assembly of claim 1, further comprising a torsional stabilizer for stabilizing said blade retainer against torsional forces, said stabilizer connected to said support body and engaging said retainer at a location between said ends of the retainer.

8. A wiper assembly attachable to a wiper arm of a motor vehicle for wiping a window thereof, said assembly comprising:

a blade element comprising;

an elongated elastomeric blade having an elongated wiping edge; and a elongated blade retainer coextensive with and supporting said blade, said retainer having two ends; and a support body for supporting said blade element, said support body supporting said retainer adjacent said ends of said retainer and operative to exert lengthwise tension on said retainer; and a torsional stabilizer for stabilizing said blade retainer against torsional forces, said stabilizer movably connected to said support body and engaging said retainer at a location between said ends of the retainer such that said stablizer provides said stabilization without applying downward biasing force to said blade retainer.

9. The wiper assembly of claim 8, wherein said torsional stabilizer has a first end pivotally connected to said support body and a second end comprising an engagement portion for engaging said retainer.

10. The wiper assembly of claim 9, wherein said engagement portion is adapted to slidably engage said retainer so that said retainer can move lengthwise with respect to said engagement portion.

11. The wiper assembly of claim 8, wherein said support body is unitary.

12. The wiper assembly of claim 11, wherein said unitary support body is comprised of a synthetic polymeric material.

13. The wiper assembly of claim 12, wherein said polymer is a reinforced composite.

14. A wiper assembly attachable to a wiper arm of a motor vehicle for wiping a window thereof, said assembly comprising:

a blade element comprising;

an elongated elastomeric blade having an elongated wiping edge; and an elongated blade retainer coextensive with and supporting said blade, said retainer having two ends and an elongated midportion; and a unitary support body for supporting said blade element, said body having first and second end portions and a central portion extending between said end portions, said central portion including an interconnect region for interconnection with the wiper arm, said first and second end portions each having gripping means, said gripping means operative to grip said blade retainer adjacent said ends of said blade retainer, said support body being operative to exert lengthwise tension on said blade retainer;

a torsional stabilizer for stabilizing said blade retainer against torsional forces, said stabilizer connected to said support body and engaging said retainer at a location between said ends of the retainer;

said blade supported in said retainer such that said blade is free to move along the length of said retainer so that when tension is exerted by said body on said retainer, said tension is not transferred to said blade.

* * * * *